US006861768B2

(12) United States Patent
Willats et al.

(10) Patent No.: US 6,861,768 B2
(45) Date of Patent: Mar. 1, 2005

(54) LOCKING SYSTEM AND METHOD

(75) Inventors: Robin Willats, Preston (GB); John Emson, West Midlands (GB); Sidney Fisher, West Midlands (GB); Gurbinder Kalsi, West Midlands (GB); Nigel Spurr, Solihull (GB); Jean Didier, Anould (FR); Alan Dixon, Chester (GB); Stephen Drysdale, Northampton (GB)

(73) Assignee: ArvinMeritor Light Vehicle Systems (UK) Ltd., Birmingham (GB)

( * ) Notice: Subject to any disclaimer, the term of this patent is extended or adjusted under 35 U.S.C. 154(b) by 191 days.

(21) Appl. No.: 10/165,203

(22) Filed: Jun. 7, 2002

(65) Prior Publication Data

US 2002/0195878 A1 Dec. 26, 2002

(30) Foreign Application Priority Data

Jun. 12, 2001 (GB) ............................................ 0114355

(51) Int. Cl.[7] ............................................... B60R 25/00

(52) U.S. Cl. ................................ 307/10.2; 340/426.17

(58) Field of Search .............................. 307/10.1, 10.3, 307/10.2, 10.6, 66, 10.4; 340/426, 539, 542, 457, 540, 425

(56) References Cited

U.S. PATENT DOCUMENTS

| | | | | |
|---|---|---|---|---|
| 5,278,547 A | * | 1/1994 | Suman et al. | 340/5.22 |
| 5,745,030 A | * | 4/1998 | Aaron | 340/426.11 |
| 5,887,466 A | | 3/1999 | Yoshizawa | |
| 6,194,997 B1 | * | 2/2001 | Buchner et al. | 340/426.26 |

FOREIGN PATENT DOCUMENTS

| | | |
|---|---|---|
| DE | 197 29 404 A | 2/1999 |
| DE | 199 14 111 A | 9/2000 |
| GB | 2 339 838 A | 2/2000 |

OTHER PUBLICATIONS

Search Report Under Section 17 for Appl. No. GB 01 14355.1 dated Aug. 21, 2001.

* cited by examiner

*Primary Examiner*—Rajnikant B. Patel
(74) *Attorney, Agent, or Firm*—Barnes & Thornburg

(57) ABSTRACT

A vehicle closure locking system comprising person sensing means, authorization device detection means and a controller, the sensing means being capable of determining whether a person is located in the vehicle and the authorization device detection means being capable of detecting the presence of a co-operating authorization device within the vehicle, wherein the controller is programmed to instruct the detection means and sensing means to commence detecting and sensing respectively in response to a predetermined event and is further programmed to control the locked state of vehicle closure(s) in response to signals supplied periodically by the sensing means and signals supplied periodically by the authorization device detection means.

18 Claims, 2 Drawing Sheets

LOCKING SYSTEM AND METHOD

This application claims priority to Great Britain patent application number GB 01 14355.1 filed on Jun. 12, 2001.

BACKGROUND OF THE INVENTION

The present invention relates to a locking system and method. In particular, the present invention relates to a locking system for vehicle closure(s) having means to sense the presence of people within a passenger compartment of the vehicle.

Passive entry systems for vehicles are known. Users of such systems usually generally carry a smart card type authorization device that in effect unlocks the doors and other closures of their vehicle when the user is in range of a smart card scanner associated with the vehicle, and the identity of the authorization device is accepted. The user then unlatches the vehicle door and enters. In some cases, the smart card also effectively energises the vehicle's start system so that the user may then press a button, for example, to start the vehicle.

Typically, there may be three lock states: unlocked, in which the door may be unlatched from inside and outside the vehicle; locked, in which the door may be unlatched from the interior but not the exterior of the vehicle (eg using an inside door handle); and double locked (super locked) in which neither intervention with the interior or exterior handles etc of the door will unlatch the door—unlatching may only be achieved by using a key, remote keyless entry device (RKE) or other authorization device to first unlock the door.

One problem with passive entry systems arises when attempting to determine the appropriate locked/unlocked status of the vehicle doors dependent upon the location of an authorized user in relation to the vehicle. In the absence of such a system, the security of the vehicle and/or personal safety of the user may be compromised.

SUMMARY OF THE INVENTION

The present invention seeks to overcome, or at least mitigate, the problems of the prior art.

One aspect of the present invention provides a vehicle closure locking system comprising person sensing means, authorization device detection means and a controller, the sensing means being capable of determining whether a person is located in the vehicle and the authorization device detection means being capable of detecting the presence of a co-operating authorization device within the vehicle, wherein the controller is programmed to instruct the detection means and sensing means to commence detecting and sensing respectively in response to a predetermined event and is further programmed to control the locked state of vehicle closure(s) in response to signals supplied periodically by the sensing means and signals supplied periodically by the authorization device detection means.

A second aspect of the present invention provides a method of controlling the locked state of a lock mechanism for a vehicle closure comprising the steps of:

(i) providing an authorization device detection means, a person sensing means and a controller;

(ii) the controller instructing the detection means and sensing means to commence detecting and sensing respectively in response to a predetermined event;

(iii) the authorization device detecting means and person sensing means supplying periodic signals to the controller;

(iv) the controller determining the appropriate locked state of the lock mechanism in response to the signals in accordance with pre-programmed instructions; and (v) the controller signalling the lock mechanism to set the appropriate locked state.

BRIEF DESCRIPTION OF THE DRAWINGS

The present invention will now be described, by way of example only, with reference to the accompanying drawings in which.

DETAILED DESCRIPTION OF THE PREFERRED EMBODIMENT

Figure 1:
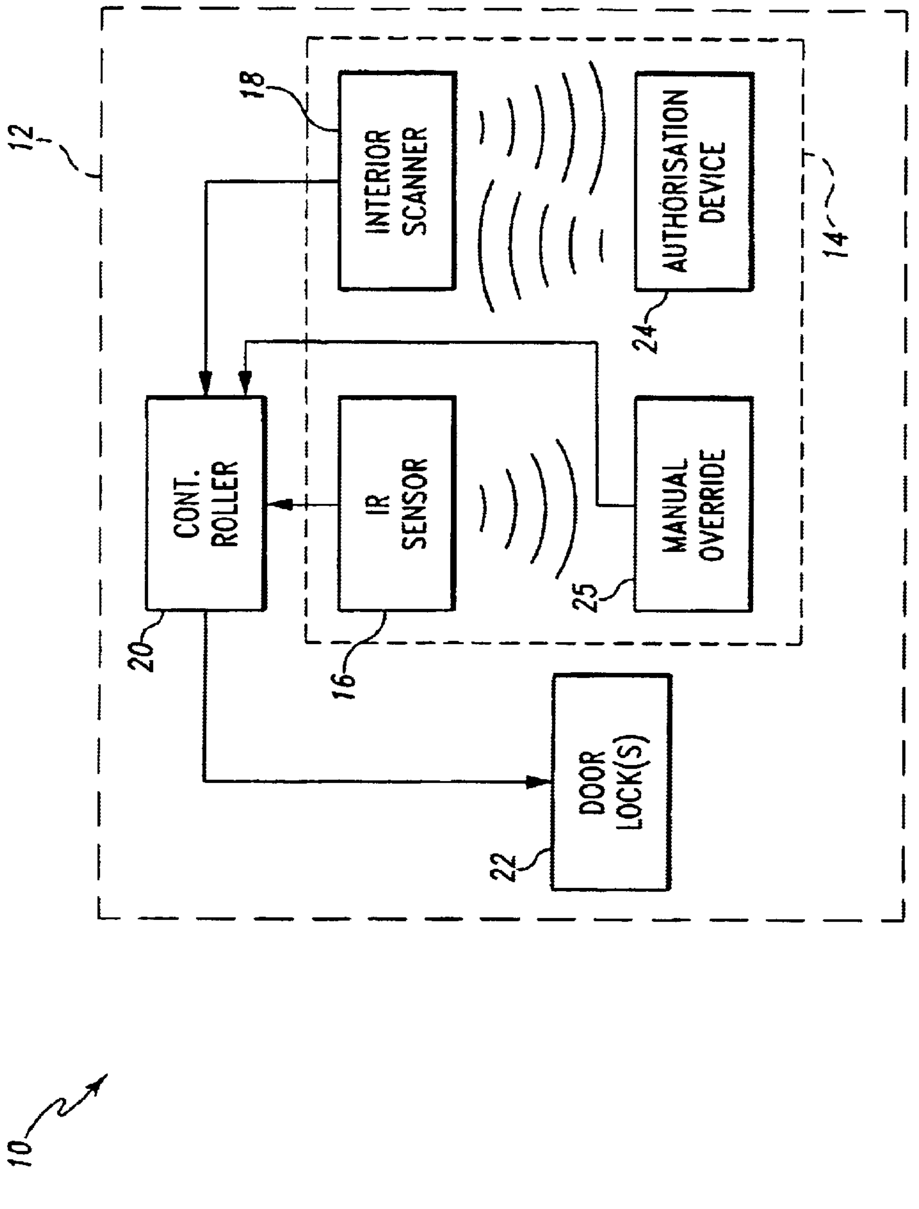
FIG. 1 is a schematic diagram of a vehicle incorporating a locking system according to the embodiment of the present invention.

Referring to FIG. 1, indicated generally at 10 is a locking system for a vehicle 12 having a passenger compartment 14. The locking system incorporates person sensing means which in this embodiment is an infra red (IR) sensor 16 arranged to be in communication with a controller 20. The controller 20 is preferably a micro-processor, and may be an overall controller for various vehicle functions, or may be dedicated purely to the locking system. In turn, the controller 20 is in communication with one or more power door lock mechanisms 22 fitted to vehicle doors and other closures as necessary.

An interior authorization device detection means, preferably a radio frequency scanner 18 is arranged to detect and interrogate a compatible authorization device 24 such as a transponder carried by a vehicle user (not shown) when inside the vehicle passenger compartment 14. In alternative embodiments, authorization device may be a conventional ignition key and the detection means a conventional ignition lock system. A manual override 25, preferably in the form of a switch, provides a further input into controller 20.

In use, when a vehicle user carrying an authorization device (hereinafter referred to as an authorized user) comes into range of an exterior authorization device detecting means (not shown), the authorization device is interrogated by the exterior detection means and if found to be valid, the exterior detection means signals the unlocking of the door locks, preferably via controller 20. A delay is then preferably provided to enable the user to enter the vehicle before the locking system of the present invention comes into operation. The locking system 10 advantageously remains in a standby state up until this point to minimise battery drain.

Once the authorized user has entered the vehicle, his/her presence is detected by the interior scanner 18 which signals the controller 20 to indicate the presence of the authorized user within the vehicle. Under normal circumstances, the controller 20 then signals the door locks to remain unlocked. However, in a preferred class of embodiments, the manual override 25 enables the authorized user to lock the vehicle doors, if for example they require protection from intruders whilst in the vehicle. Optionally, a motion sensor may be provided (not shown) in communication with the controller 20 such that door locks 22 may be automatically locked when the vehicle exceeds a certain speed such as 5 km/h, for example.

If the IR sensor 16 detects and signals the controller 20 of the presence of one or more people in the passenger compartment 14, but no authorization device 24 is detected, the controller 20 determines that there are unauthorized people in the vehicle. The term "unauthorized people" does not necessarily mean that the people are intruders, present without permission of the authorized user, merely that the people do not possess an appropriate authorization device.

In one embodiment, the controller 20 locks or double locks the vehicle doors when unauthorized people are detected in the vehicle in the absence of an authorized person. The controller may also signal the triggering of an intruder alarm fitted to the vehicle (not shown) or any other suitable security measure. However, an alternative mode of operation may cause the vehicle to remain unlocked when unauthorized people are in the vehicle, either in response to a further manual override (not shown), preferably in the form of a PIN or other code, or to pre-programmed instructions of the controller 20. This alternative mode enables an authorized user to permit unauthorized people to remain in the vehicle once he/she has left without locking them in or causing the intruder alarm to sound. Such an override is useful if the authorized user leaves the vehicle to refuel it, for example, whilst other people remain inside.

If a user accidentally leaves their authorization device in the vehicle when they exit, the controller 20 detects this as a further occupancy condition and again determines whether to lock or leave the vehicle closures unlocked in response to the detection of this particular condition.

The authorization device detection means 18 and person sensing means 16 periodically supply signals to the controller 20 to ensure that any changes in the occupancy state of the vehicle are detected, and the locked state of the vehicle closures is updated accordingly.

Figure 2:
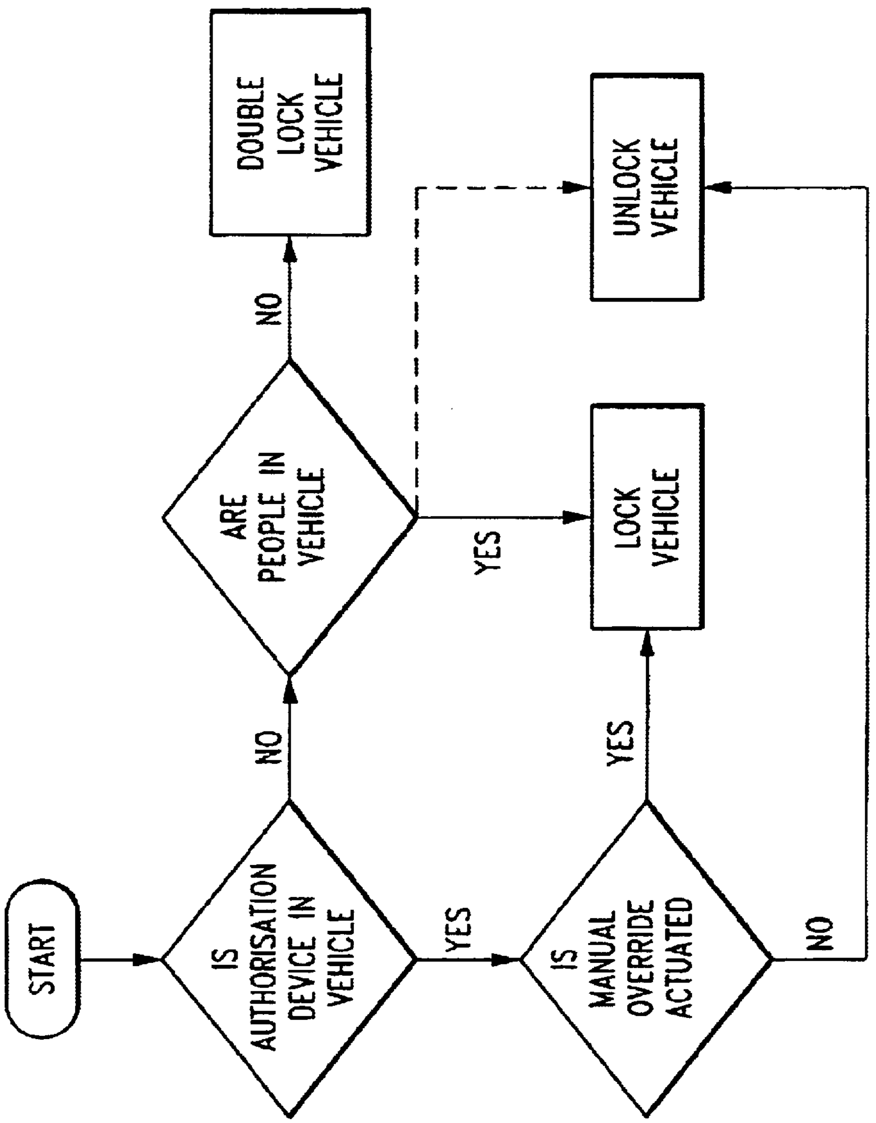
FIG. 2 is a flow chart illustrating the functioning of the system.

Once the vehicle has been unlocked due to a detection of the authorization device 24 by the exterior detection means and a predetermined period of time elapsed in which neither the authorized user nor any unauthorized people have entered the vehicle, the controller 20 signals the double locking of the vehicle door locks as a security measure. Alternatively, the vehicle will remain unlocked whilst the authorized user continues to be detected by the exterior detection means with double locking only occurring as a fail-safe measure once the user moves out of range. The functioning of the locking system is illustrated in the flow chart, shown in FIG. 2.

It can be seen that the system of the present invention provides enhanced security to both authorized vehicle users and vehicles themselves whilst operating in an unobtrusive and reliable manner. The system enables the controller to distinguish between four separate conditions: authorized vehicle occupants present, unauthorized vehicle occupants present, no occupancy without an authorization device present, and no occupancy with an authorization device present.

To exit the vehicle, the authorized user or unauthorized people may manually override the locking if single locked by pulling a sill button attached to the lock, for example. However, only an authorized user may unlock the vehicle when double locked.

Numerous changes may be made within the scope of the present invention. For example, alternative means for detecting people in the vehicle may be used such as pressure sensors in the seats or barometric sensors. It should be appreciated that the present invention has applications outside our vehicle access control and may be used in building access control, for example.

The foregoing description is only exemplary of the principles of the invention. Many modifications and variations of the present invention are possible in light of the above teachings. The preferred examples of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle closure locking system comprising: a person sensor capable of determining whether a person is located in a vehicle, an authorization device detector capable of detecting the presence of a co-operating passive authorization device within the vehicle, and a controller programmed to instruct the detector and the sensor to commence detecting and sensing, respectively, in response to the unlocking of at least one vehicle closure, and further programmed to cease detecting and sensing once neither a person nor an authorization device are detected and sensed, respectively, and to control a locked state of at least one vehicle closure in response to signals supplied periodically by the sensor and the authorization device detector.

2. The vehicle closure locking system according to claim 1 wherein at least one closure is unlocked by a passive unlocking system.

3. The vehicle closure locking system according to claim 2 wherein the authorization device is carried to passively unlock the at least one vehicle closure.

4. The vehicle closure locking system according to claim 1 wherein the person sensor is an infrared sensor.

5. The vehicle closure locking system according to claim 1, wherein the person sensor is a camera.

6. The vehicle closure locking system according to claim 1 wherein the controller is programmed to delay instructing the detector and the sensor after an authorization device is detected in a predetermined vicinity of the vehicle.

7. A vehicle closure locking system comprising: a person sensor capable of determining whether a person is located in a vehicle, an authorization device detector capable of detecting the presence of a co-operating authorization device within the vehicle, and a controller programmed to instruct the detector and the sensor to commence detecting and sensing, respectively, in response to the unlocking of a closure and to control a locked state of at least one vehicle closure in response to signals supplied periodically by the sensor and the authorization device detector, wherein the controller is programmed to detect a vehicle occupancy state including an authorized vehicle occupant, an unauthorized vehicle occupant, no occupancy without an authorization device and no occupancy with an authorization device on the basis of signals from the sensor and the detector, and the controller is further programmed to signal the appropriate locked state of the at least one vehicle closure in response to the vehicle occupancy state.

8. The vehicle closure locking system according to claim 1 wherein the controller is programmed to maintain the vehicle in an unlocked state if the authorization device is detected in the vehicle.

9. The vehicle closure locking system according to claim 1 wherein the controller is programmed to cause the at least one vehicle closure to be in an unlocked state if the authorization device and a person are detected in the vehicle.

10. The vehicle closure locking system according to claim 8 wherein a manual override is provided to cause the locking of the at least one vehicle closure when the authorization device is detected in the vehicle.

11. The vehicle closure locking system according to claim 9 wherein a manual override is provided to cause the locking of the at least one vehicle closure when the authorization device is detected in the vehicle.

12. The vehicle closure locking system according to claim 1 wherein the controller is programmed to lock the at least one vehicle closure when the authorization device and a person are not detected in the vehicle.

13. The vehicle closure system according to claim 1 wherein the controller is programmed to double-lock the at least one vehicle closure when the authorization device and a person are not detected in the vehicle.

14. The vehicle closure locking system according to claim 1 wherein the controller is programmed to cause the at least one vehicle closure to remain locked if no authorization device is detected in the vehicle and a person is detected in the vehicle.

15. The vehicle closure locking system according to claim 1 wherein the controller is programmed to cause the at least one vehicle closure to unlock if no authorization device is detected in the vehicle and a person is detected in the vehicle.

16. The vehicle closure locking system according to claim 1 wherein the detector is an electromagnetic radiation scanning device.

17. The vehicle closure locking system according to claim 16 wherein the electromagnetic radiation scanning device uses radio frequency waves.

18. A method of controlling the locked state of a lock mechanism for a vehicle closure comprising the steps of:

(i) providing a passive authorization device detector and a person sensor in a vehicle;

(ii) instructing the detector and sensor to commence detecting and sensing within the vehicle, respectively, in response to the unlocking of a vehicle closure;

(iii) supplying periodic signals to the controller by the detector and the sensor;

(iv) determining an appropriate locked state of the lock mechanism in response to the signals in accordance with pre-programmed instructions;

(v) signalling the lock mechanism to set the appropriate locked state; and (vi) ceasing detection if neither a person nor an authorization device are sensed or detected, respectively.

* * * * *